United States Patent Office 3,290,349
Patented Dec. 6, 1966

3,290,349
PREPARATION OF ALKYLALUMINUM HALIDES
Allan J. Lundeen, Ponca City, Okla., and Donald M. Coyne, Prairie Village, Kans., assignors to Continental Oil Company, Ponca City, Okla., a corporation of Oklahoma
No Drawing. Filed May 31, 1963, Ser. No. 284,318
10 Claims. (Cl. 260—448)

This invention relates to preparation of alkylaluminum halides. In one aspect, the invention relates to a process of preparing alkylaluminum chlorides by reaction of alkylaluminum alkoxides with aluminum chloride. In another aspect, the invention relates to preparation of dialkylauminum chlorides and alkylaluminum dichlorides by reaction of alkylaluminum alkoxides with aluminum chloride, and separation of the resulting product.

Alkylaluminum alkoxides are becoming generally available, and can be formed in several known manners. Among these are reaction of an aluminum alkyl with epoxides or with formaldehyde. The alkylaluminum alkoxides can also be formed by controlled oxidation of a trialkylaluminum. However, the alkoxides are ineffective in many applications in which the corresponding halide or dihalide can be used. Among such applications are use as a polymerization catalyst, use as an alkylation catalyst, reaction with acid halides, and use in a low pressure growth reaction. Because of equilibrium and association considerations of organoaluminum compounds, prediction of a suitable method for preparing alkylaluminum chlorides is generally considered to be impossible on the basis of present knowledge of such systems.

It is an object of this invention to provide a process for preparing alkylaluminum halides. It is another object of the invention to provide a process for converting alkylaluminum alkoxides to alkylaluminum halides.

Other aspects, objects and the several advantages of this invention will become apparent upon study of this disclosure and the appended claims to the invention.

According to the invention, there is provided a process for preparing an alkylaluminum chloride which comprises contacting a compound of the structural formula $RR_1AlOR_2$, wherein R and $R_1$ each comprises alkyl of at most 3 carbon atoms and $R_2$ is selected from the group consisting of alkyl and cycloalkyl, with aluminum chloride, and recovering from the reaction mixture a compound selected from the group consisting of $$RR_1AlCl,$$

$RAlCl_2$ and $R_1AlCl_2$.

The reactions of this invention can be illustrated as follows:

$$RR_1AlOR_2 + AlCl_3 \rightarrow AlRR_1Cl + AlCl_2OR_2$$

and $$RR_1AlOR_2 + 2AlCl_3 \rightarrow RAlCl_2 + R_1AlCl_2 + AlCl_2OR_2$$

wherein R and $R_1$ are each alkyl of 1 to 3 carbon atoms, i.e., methyl, ethyl, propyl or isopropyl, and $R_2$ is alkyl or cycloalkyl of 2 to about 30 carbon atoms. It is seen from consideration of these equations that the di(lower alkyl) aluminum alkoxide is converted to the mono- or di-chloro aluminum alkyl depending upon the amount of aluminum chloride present in the reaction mixture. Thus, small amounts of aluminum chloride favor formation of the dialkyl monohalide, while excess aluminum chloride favors formation of the monoalkyl dihalide. Intermediate amounts of aluminum chloride result in a mixed product of mono- and dihalides. The usual ratio of starting materials is at least one equivalent of chlorine per alkoxy group, and is preferably in the range of about 1:1 to about 9:1.

Suitable di(lower alkyl)aluminum alkoxides include
diethyl aluminum ethoxide,
di-n-propyl aluminum cyclopentanoxide,
di-i-propyl aluminum 4-ethylheptanoxide,
ethyl-n-propyl aluminum n-dodecanoxide,
ethyl-i-propyl aluminum 2-ethylcyclohexanoxide,
n-propyl-i-propyl aluminum i-pentoxide,
methylethyl aluminum n-butoxide,
dimethyl aluminum n-triacontanoxide, and
methyl-n-propyl aluminum 2,3-diamylcyclohexanoxide.

Neither pressure nor temperature are critical in the reactions, and we accordingly prefer to carry out the reaction at about room temperature and, as will be explained, at a pressure of about atmospheric or less, although pressures and temperatures above or below atmospheric are within the scope of the invention. The reaction proceeds rapidly, and is accordingly adapted to short contact time. Of the aluminum alkoxide starting materials of the invention, the lower alkoxides are liquid, and a preferred procedure of effecting the reaction consists merely in dissolving anhydrous aluminum chloride in the alkoxide without solvent or diluent. However, the higher aluminum alkoxides are solid, and an inert solvent or diluent is in this instance desirable in order to effect intimate contact of the reactants. Further, the reaction should be carried out in the presence of an inert atmosphere, such as nitrogen, argon, krypton or helium, in order to prevent decomposition of the reactants and products.

The reaction mixture is separated into the desired products as by distillation. In view of the thermal sensitivity of the products, separation is preferably effected at low pressure, e.g., at about 50 mm. Hg or lower. Removal of the halide product in this manner as overhead, with alkoxide product remaining behind as distillation residue, also has the advantage of shifting the reaction equilibrium in a forward direction.

The invention will now be further illustrated by the following specific examples.

Example 1

One hundred grams of diethylaluminum 2,2-dimethyl-1-pentoxide (B.P. 190° C./7 mm. Hg) was mixed with 18 g. anhydrous aluminum chloride. The aluminum chloride dissolved with evolution of heat. Distillation of the reaction mixture yielded 18 g. of material boiling below diethylaluminum 2,2 - dimethyl-1-pentoxide, which latter material was about 60% diethylaluminum chloride. Analysis showed:

| | Calculated for diethylaluminum chloride | Calculated for diethylaluminum 2,2-dimethyl-1-pentoxide | Found |
|---|---|---|---|
| Aluminum, percent | 22.5 | 13.5 | 18.4 |
| Chlorine, percent | 29.6 | 0 | 19.8 |
| Ethane evolved by hydrolysis, l./g | 0.373 | 0.224 | 0.303 |

Example 2

Sixty-five grams of dimethylaluminum n-butoxide are mixed with 200 g. anhydrous aluminum chloride. Low pressure fractionation of the reaction mixture yields methylaluminum dichloride as distillate and dichloroaluminum n-butoxide as residue.

Having thus described the invention by providing specific examples thereof, it is to be understood that no undue limitations or restrictions are to be drawn by

What is claimed is:

1. A process for preparing an alkylaluminum chloride which comprises contacting a compound of the structural formula $RR_1AlOR_2$, wherein R and $R_1$ each comprises alkyl of at most 3 carbon atoms and $R_2$ is selected from the group consisting of alkyl and cycloalkyl, with aluminum chloride, and recovering from the reaction mixture a compound selected from the group consisting of $RR_1AlCl$, $RAlCl_2$ and $R_1AlCl_2$.

2. The process of claim 1 wherein R and $R_1$ are each ethyl, and wherein $R_2$ contains between 2 and about 30 carbon atoms.

3. A process for preparing a dialkylaluminum chloride which comprises contacting a compound of the structural formula $RR_1AlOR_2$, wherein R and $R_1$ each comprises alkyl of at most 3 carbon atoms and $R_2$ is selected from the group consisting of alkyl and cycloalkyl, with about an equimolar quantity of aluminum chloride, and separating from the reaction mixture a dialkylaluminum chloride of the structure $RR_1AlCl$.

4. The process of claim 3 wherein R and $R_1$ are each ethyl, and wherein $R_2$ contains between 2 and about 30 carbon atoms.

5. The process of claim 4 wherein $R_2$ is 2,2-dimethyl-n-amyl.

6. A process for preparing an alkylaluminum dichloride which comprises contacting a compound of the structural formula $RR_1AlOR_2$, wherein R and $R_1$ each comprises alkyl of at most 3 carbon atoms and $R_2$ is selected from the group consisting of alkyl and cycloalkyl, with about 2 moles aluminum chloride per mole of alkyl aluminum alkoxide, and separating from the reaction mixture alkylaluminum dichloride.

7. The process of claim 6 wherein R and $R_1$ are each ethyl, and wherein $R_2$ contains between 2 and about 30 carbon atoms.

8. The process of claim 7 wherein $R_2$ is 2,2-dimethyl-n-amyl.

9. A process for preparing an alkylaluminum chloride and dichloroaluminum alkoxide which comprises contacting a compound of the structural formula $RR_1AlOR_2$, wherein R and $R_1$ each comprises alkyl of at most 3 carbon atoms and $R_2$ is selected from the group consisting of alkyl and cycloalkyl, with aluminum chloride, and subjecting the reaction mixture to low pressure distillation to recover as distillate at least one compound selected from the group consisting of $RR_1AlCl$, $RAlCl_2$, and $R_1AlCl_2$ and as residue a compound of the formula $AlCl_2OR$.

10. The process of claim 9 wherein R and $R_1$ are each ethyl, and wherein $R_2$ contains between 2 and about 30 carbon atoms.

No references cited.

TOBIAS E. LEVOW, *Primary Examiner.*